(12) United States Patent
Fisher et al.

(10) Patent No.: US 8,084,532 B2
(45) Date of Patent: Dec. 27, 2011

(54) SILICONE RESIN FILM, METHOD OF PREPARING SAME, AND NANOMATERIAL-FILLED SILICONE COMPOSITION

(75) Inventors: Mark Fisher, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 202 days.

(21) Appl. No.: 12/084,858

(22) PCT Filed: Nov. 22, 2006

(86) PCT No.: PCT/US2006/045107
§ 371 (c)(1),
(2), (4) Date: May 12, 2008

(87) PCT Pub. No.: WO2008/051242
PCT Pub. Date: May 2, 2008

(65) Prior Publication Data
US 2010/0062247 A1    Mar. 11, 2010

Related U.S. Application Data

(60) Provisional application No. 60/760,261, filed on Jan. 19, 2006.

(51) Int. Cl.
C08K 3/04 (2006.01)
B32B 27/00 (2006.01)
(52) U.S. Cl. ......... 524/496; 524/497; 977/701; 977/902
(58) Field of Classification Search .................. 524/495, 524/496; 977/701, 734–753
See application file for complete search history.

(56) References Cited

U.S. PATENT DOCUMENTS

| | | | |
|---|---|---|---|
| 0,736,971 A | 8/1903 | Jenkins | |
| 2,702,764 A | 2/1955 | Painter et al. | |
| 2,915,475 A | 12/1959 | Bugosh et al. | |
| 3,031,417 A | 4/1962 | Bruce | |
| 3,419,593 A | 12/1968 | Willing et al. | |
| 3,445,420 A | 5/1969 | Kookootsedes et al. | |
| 4,087,585 A | 5/1978 | Schulz | |
| 4,260,780 A | 4/1981 | West | |
| 4,273,697 A | 6/1981 | Sumimura et al. | |
| 4,276,424 A | 6/1981 | Peterson, Jr. et al. | |
| 4,314,956 A | 2/1982 | Baney et al. | |
| 4,324,901 A | 4/1982 | West et al. | |
| 4,332,525 A | 6/1982 | Cheney, Jr. | |
| 4,395,443 A | 7/1983 | Shimizu et al. | |
| 4,460,638 A | 7/1984 | Haluska | |
| 4,460,639 A | 7/1984 | Chi et al. | |
| 4,460,640 A | 7/1984 | Chi et al. | |
| 4,500,447 A | 2/1985 | Kobayashi et al. | |
| 4,510,094 A | 4/1985 | Drahnak et al. | |
| 4,530,879 A | 7/1985 | Drahnak et al. | |
| 4,537,829 A | 8/1985 | Blizzard et al. | |
| 4,568,566 A | 2/1986 | Tolentino | |
| 4,618,666 A | 10/1986 | Porte | |
| 4,761,454 A | 8/1988 | Oba et al. | |
| 4,766,176 A | 8/1988 | Lee et al. | |
| 4,898,689 A * | 2/1990 | Hamada et al. | 252/510 |
| 4,916,169 A | 4/1990 | Boardman et al. | |
| 4,952,658 A | 8/1990 | Kalchauer et al. | |
| 5,017,654 A | 5/1991 | Togashi et al. | |
| 5,135,980 A * | 8/1992 | Watanabe | 524/496 |
| 5,166,287 A | 11/1992 | Kalchauer et al. | |
| 5,194,649 A | 3/1993 | Okawa | |
| 5,213,868 A * | 5/1993 | Liberty et al. | 428/131 |
| 5,256,480 A | 10/1993 | Inoue et al. | |
| 5,278,272 A | 1/1994 | Lai et al. | |
| 5,281,455 A | 1/1994 | Braun et al. | |
| 5,283,309 A | 2/1994 | Morita | |
| 5,310,843 A | 5/1994 | Morita | |
| 5,312,946 A | 5/1994 | Stank et al. | |
| 5,358,983 A | 10/1994 | Morita | |
| 5,371,139 A | 12/1994 | Yokoyama et al. | |
| 5,468,826 A | 11/1995 | Gentle et al. | |
| 5,468,827 A | 11/1995 | Morita | |
| 5,474,608 A | 12/1995 | Beisswanger et al. | |
| 5,486,588 A | 1/1996 | Morita | |
| 5,496,961 A | 3/1996 | Dauth et al. | |
| 5,530,075 A | 6/1996 | Morita | |
| 5,580,915 A * | 12/1996 | Lin | 524/267 |
| 5,581,008 A | 12/1996 | Kobayashi | |
| 5,738,976 A | 4/1998 | Okinoshima et al. | |

(Continued)

FOREIGN PATENT DOCUMENTS

CN    1528000 A    9/2004

(Continued)

OTHER PUBLICATIONS

Frogley et al. "Mechanical Properties of Carbon Nanoparticle-Reinforced Elastomers" Composites Science and Technology, 2003(63), 1647-1654.*
Reese, Herschel, "Development of Silicone Substrates to be Used With CIGS Deposition," AFOSR/NL Report, Feb. 1, 2005, pp. 1-59, Air Force Office of Scientific Research, Arlington, Virginia.
English language abstract of JP 59-096122 extracted from espacenet.com database dated Aug. 26, 2011; 1 page.
English language abstract of FR 2564470 extracted from espacenet.com database dated Oct. 12, 2010; 2 pages.
English language abstract of JP 10-001549 extracted from espacenet.com database dated Aug. 26, 2011; 1 page.
English language abstract of DE 19647368 extracted from espacenet.com database dated Aug. 26, 2011; 1 page.
English language abstract of DE 19915378 extracted from espacenet.com database dated Aug. 26, 2011; 1 page.
English language abstract of DE 4033157 extracted from espacenet.com database dated Aug. 26, 2011; 1 page.
English language abstract of TW 2004/18964 dated Sep. 23, 2010; 3 pages.
English language translation and abstract for JP 2004-339427 extracted from PAJ database, dated Oct. 15, 2010, 51 pages.

(Continued)

Primary Examiner — Robert Loewe
(74) Attorney, Agent, or Firm — Howard & Howard Attorneys PLLC

(57) ABSTRACT

A method of preparing a silicone resin film, the method comprising coating a release liner with a nanomaterial-filled silicone composition comprising a condensation-curable silicone composition and a carbon nanomaterial, and curing the silicone resin of the coated release liner; a silicone resin film prepared according to the preceding method, and a nanomaterial-filled silicone composition.

11 Claims, No Drawings

U.S. PATENT DOCUMENTS

| | | | | |
|---|---|---|---|---|
| 5,747,608 A * | 5/1998 | Katsoulis et al. | 525/477 |
| 5,794,649 A | 8/1998 | Spear et al. | |
| 5,801,262 A | 9/1998 | Adams | |
| 5,824,761 A | 10/1998 | Bujanowski et al. | |
| 5,861,467 A | 1/1999 | Bujanowski et al. | |
| 5,904,796 A * | 5/1999 | Freuler et al. | 156/278 |
| 5,959,038 A | 9/1999 | Furukawa et al. | |
| 5,972,512 A * | 10/1999 | Boisvert et al. | 428/409 |
| 6,046,283 A * | 4/2000 | Katsoulis et al. | 525/477 |
| 6,194,063 B1 * | 2/2001 | Oura et al. | 428/343 |
| 6,204,301 B1 | 3/2001 | Oshima et al. | |
| 6,287,639 B1 | 9/2001 | Schmidt et al. | |
| 6,297,305 B1 | 10/2001 | Nakata et al. | |
| 6,310,146 B1 | 10/2001 | Katsoulis et al. | |
| 6,352,610 B1 | 3/2002 | Schmidt et al. | |
| 6,368,535 B1 | 4/2002 | Katsoulis et al. | |
| 6,376,078 B1 | 4/2002 | Inokuchi | |
| 6,378,599 B1 | 4/2002 | Schmidt et al. | |
| 6,387,487 B1 * | 5/2002 | Greenberg et al. | 428/355 R |
| 6,407,922 B1 * | 6/2002 | Eckblad et al. | 361/704 |
| 6,432,497 B2 * | 8/2002 | Bunyan | 428/40.1 |
| 6,451,869 B1 | 9/2002 | Butts | |
| 6,617,674 B2 | 9/2003 | Becker et al. | |
| 6,644,395 B1 * | 11/2003 | Bergin | 165/185 |
| 6,652,958 B2 * | 11/2003 | Tobita | 428/298.1 |
| 6,656,425 B1 | 12/2003 | Benthien et al. | |
| 6,660,395 B2 | 12/2003 | McGarry et al. | |
| 6,689,859 B2 | 2/2004 | Li et al. | |
| 6,730,731 B2 * | 5/2004 | Tobita et al. | 524/495 |
| 6,783,692 B2 * | 8/2004 | Bhagwagar | 252/70 |
| 6,791,839 B2 * | 9/2004 | Bhagwagar | 361/705 |
| 6,831,145 B2 | 12/2004 | Kleyer et al. | |
| 6,838,005 B2 | 1/2005 | Tepper | |
| 6,841,213 B2 | 1/2005 | Parsonage et al. | |
| 6,884,314 B2 * | 4/2005 | Cross et al. | 156/329 |
| 6,902,688 B2 | 6/2005 | Narayan et al. | |
| 6,908,682 B2 | 6/2005 | Mistele | |
| 7,029,603 B2 | 4/2006 | Wang et al. | |
| 7,037,592 B2 | 5/2006 | Zhu et al. | |
| 7,074,481 B2 | 7/2006 | Watson | |
| 7,132,062 B1 * | 11/2006 | Howard | 252/500 |
| 7,147,367 B2 * | 12/2006 | Balian et al. | 374/44 |
| 7,163,720 B1 | 1/2007 | Dhaler et al. | |
| 7,253,442 B2 | 8/2007 | Huang et al. | |
| 7,311,967 B2 | 12/2007 | Dani et al. | |
| 7,339,012 B2 * | 3/2008 | Prasse | 525/477 |
| 7,381,470 B2 | 6/2008 | Suto et al. | |
| 7,459,192 B2 | 12/2008 | Parsonage et al. | |
| 7,563,515 B2 | 7/2009 | Ekeland et al. | |
| 7,622,159 B2 | 11/2009 | Mertz et al. | |
| 7,658,983 B2 | 2/2010 | Mormont et al. | |
| 7,799,842 B2 | 9/2010 | Anderson et al. | |
| 7,850,870 B2 | 12/2010 | Ahn et al. | |
| 2003/0047718 A1 | 3/2003 | Narayan et al. | |
| 2003/0054162 A1 | 3/2003 | Watson | |
| 2003/0077478 A1 * | 4/2003 | Dani et al. | 428/673 |
| 2003/0096104 A1 * | 5/2003 | Tobita et al. | 428/332 |
| 2003/0170418 A1 | 9/2003 | Mormont et al. | |
| 2003/0175533 A1 | 9/2003 | McGarry et al. | |
| 2003/0213939 A1 | 11/2003 | Narayan et al. | |
| 2004/0053059 A1 | 3/2004 | Mistele | |
| 2004/0089851 A1 * | 5/2004 | Wang et al. | 252/500 |
| 2004/0101679 A1 * | 5/2004 | Mertz et al. | 428/355 RA |
| 2004/0126526 A1 | 7/2004 | Parsonage et al. | |
| 2004/0166332 A1 | 8/2004 | Zhu et al. | |
| 2005/0113749 A1 | 5/2005 | Parsonage et al. | |
| 2005/0227091 A1 * | 10/2005 | Suto et al. | 428/447 |
| 2005/0281997 A1 | 12/2005 | Grah | |
| 2007/0020468 A1 | 1/2007 | Ekeland et al. | |
| 2007/0120100 A1 | 5/2007 | Glatkowski et al. | |
| 2007/0246245 A1 * | 10/2007 | Ahn et al. | 174/126.2 |
| 2008/0051548 A1 | 2/2008 | Bailey et al. | |
| 2008/0138525 A1 | 6/2008 | Bailey et al. | |
| 2009/0005499 A1 | 1/2009 | Fisher et al. | |
| 2009/0090413 A1 | 4/2009 | Katsoulis et al. | |
| 2009/0105362 A1 | 4/2009 | Anderson et al. | |
| 2009/0155577 A1 | 6/2009 | Anderson et al. | |
| 2009/0246499 A1 | 10/2009 | Katsoulis et al. | |
| 2010/0028643 A1 | 2/2010 | Zhu | |
| 2010/0062247 A1 | 3/2010 | Fisher et al. | |
| 2010/0068538 A1 | 3/2010 | Fisher | |
| 2010/0075127 A1 | 3/2010 | Fisher et al. | |
| 2010/0086760 A1 | 4/2010 | Zhu | |
| 2010/0087581 A1 | 4/2010 | Fisher et al. | |
| 2010/0112321 A1 | 5/2010 | Zhu | |
| 2010/0129625 A1 | 5/2010 | Zhu | |
| 2010/0143686 A1 | 6/2010 | Zhu | |
| 2010/0209687 A1 | 8/2010 | Zhu | |
| 2010/0233379 A1 | 9/2010 | Fisher et al. | |
| 2010/0280172 A1 | 11/2010 | Zhu | |

FOREIGN PATENT DOCUMENTS

| | | |
|---|---|---|
| CN | 1558931 A | 12/2004 |
| CN | 1676568 A | 10/2005 |
| DE | 19647368 | 5/1998 |
| DE | 19915378 A1 | 10/2000 |
| DE | 4033157 | 9/2003 |
| EP | 0126535 A1 | 11/1984 |
| EP | 0358452 A2 | 3/1990 |
| EP | 0480680 A1 | 4/1992 |
| EP | 0566311 A2 | 10/1993 |
| EP | 0562922 B1 | 5/1997 |
| EP | 0850998 A2 | 7/1998 |
| EP | 0936250 A2 | 8/1999 |
| EP | 1050538 A2 | 11/2000 |
| EP | 1065248 A2 | 1/2001 |
| EP | 1454962 A1 | 9/2004 |
| EP | 1391492 B1 | 6/2006 |
| FR | 2564470 A1 | 11/1985 |
| GB | 736971 | 9/1955 |
| JP | 59-096122 | 6/1984 |
| JP | 10-001549 | 1/1998 |
| JP | 2004-339427 A | 12/2004 |
| JP | 2007-090817 A | 4/2007 |
| TW | 2004/18964 A | 10/2004 |
| WO | 1994/017003 A1 | 8/1994 |
| WO | 02/085612 A2 | 10/2002 |
| WO | 02082468 A1 | 10/2002 |
| WO | 2003/078079 A1 | 9/2003 |
| WO | 2003/099828 A1 | 12/2003 |
| WO | 2004/035661 A1 | 4/2004 |
| WO | 2004/060472 A1 | 7/2004 |
| WO | 2004/106420 A2 | 12/2004 |
| WO | 2005/114324 A2 | 12/2005 |
| WO | 2006/088645 A1 | 8/2006 |
| WO | 2006/088646 A1 | 8/2006 |
| WO | 2007/013135 A1 | 2/2007 |
| WO | 2007/018756 A1 | 2/2007 |
| WO | 2007/092118 A2 | 8/2007 |
| WO | WO 2007/097835 A2 | 8/2007 |
| WO | 2007/121006 A2 | 10/2007 |
| WO | 2007/123901 A1 | 11/2007 |
| WO | 2008/013611 A1 | 1/2008 |
| WO | 2008/013612 A1 | 1/2008 |
| WO | 2008/045104 A2 | 4/2008 |
| WO | 2008/051242 A2 | 5/2008 |
| WO | 2009/007786 A2 | 1/2009 |

OTHER PUBLICATIONS

English language abstract of CN 1558931 extracted from espacenet.com database dated Aug. 26, 2011; 1 page.

English language abstract of CN 1676568 extracted from espacenet.com database dated Mar. 1, 2011; 1 page.

English language abstract of JP 2007-090817 extracted from espacenet.com database dated Aug. 26, 2011; 1 page.

Guo, Andrew, et al., "Highly Active Visible-Light Photocatalysts for Curing a Ceramic Precursor," Chemical Materials, 1998, pp. 531-536, vol. 10, American Chemical Society.

Zhu, H.Y., "Novel synthesis of aluminum oxide nanofibers," Materials Research Society Symposium Proceedings, vol. 703, held Nov. 26-29, 2001, Nanophase and Nanocomposite Materials IV. Symposium, published 2002, pp. 25-30, Materials Research Society, Warrendale, Pennsylvania, USA.

* cited by examiner

SILICONE RESIN FILM, METHOD OF PREPARING SAME, AND NANOMATERIAL-FILLED SILICONE COMPOSITION

CROSS REFERENCE TO RELATED APPLICATIONS

This application is a U.S. national stage filing under 35 U.S.C. §371 of PCT Application No. PCT/US2006/045107 filed on 22 Nov. 2006, currently pending, which claims the benefit of U.S. Provisional Patent Application No. 60/760,261 filed 19 Jan. 2006 under 35 U.S.C. §119 (e). PCT Application No. PCT/US2006/045107 and U.S. Provisional Patent Application No. 60/760,261 are hereby incorporated by reference.

FIELD OF THE INVENTION

The present invention relates to a method of preparing a silicone resin film and more particularly to a method comprising coating a release liner with a nanomaterial-filled silicone composition comprising a condensation-curable silicone composition and a carbon nanomaterial, and curing the silicone resin of the coated release liner. The present invention also relates to a silicone resin film prepared according to the preceding method, and to a nanomaterial-filled silicone composition.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a method of preparing a silicone resin film, the method comprising the steps of:
coating a release liner with a nanomaterial-filled silicone composition, wherein the silicone composition comprises:
a condensation-curable silicone composition comprising a silicone resin having an average of at least two silicon-bonded hydrogen atoms, hydroxy groups, or hydrolysable groups per molecule, and
a carbon nanomaterial; and
curing the silicone resin of the coated release liner.
The present invention is also directed to a silicone resin film prepared according to the aforementioned method.
The present invention is further directed to a nanomaterial-filled silicone composition, comprising:
a condensation-curable silicone composition comprising a silicone resin having an average of at least two silicon-bonded hydrogen atoms, hydroxy groups, or hydrolysable groups per molecule; and
a carbon nanomaterial.

The silicone resin film of the present invention has low coefficient of thermal expansion, high tensile strength, and high modulus compared to a silicone resin film prepared from the same silicone composition absent the carbon nanomaterial. Also, although the filled (i.e., carbon nanomaterial-containing) and unfilled silicone resin films have comparable glass transition temperatures, the former film exhibits a smaller change in modulus in the temperature range corresponding to the glass transition.

The silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

DETAILED DESCRIPTION OF THE INVENTION

As used herein, the term "mol % of the groups $R^2$ in the silicone resin are hydrogen, hydroxy, or a hydroslysable group" is defined as the ratio of the number of moles of silicon-bonded hydrogen, hydroxy, or hydroslysable groups in the silicone resin to the total number of moles of the groups $R^2$ in the resin, multiplied by 100. Further, the term "mol % of the groups $R^4$ in the silicone resin are hydroxy or hydrolysable groups" is defined as the ratio of the number of moles of silicon-bonded hydroxy or hydrolysable groups in the silicone resin to the total number of moles of the groups $R^4$ in the resin, multiplied by 100.

A nanomaterial-filled silicone composition according to the present invention, comprises:
a condensation-curable silicone composition comprising a silicone resin having an average of at least two silicon-bonded hydrogen atoms, hydroxy groups, or hydrolysable groups per molecule; and
a carbon nanomaterial.

The condensation-curable silicone composition can be any condensation-curable silicone composition containing a silicone resin having an average of at least two silicon-bonded hydrogen atoms, hydroxy groups, or hydrolysable groups per molecule. Typically, the condensation-curable silicone composition comprises the aforementioned silicone resin and, optionally, a cross-linking agent having silicon-bonded hydrolysable groups and/or a condensation catalyst.

The silicone resin of the condensation-curable silicone composition is typically a copolymer containing T siloxane units, or T and/or Q siloxane units in combination with M and/or D siloxane units. Moreover, the silicone resin can be a rubber-modified silicone resin, described below for the second embodiment of the condensation-curable silicone composition.

According to a first embodiment, the condensation-curable silicone composition comprises a silicone resin having the formula $(R^1R^2{}_2SiO_{1/2})_w(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8, and the silicone resin has an average of at least two silicon-bonded hydrogen atoms, hydroxy groups, or hydrolysable groups per molecule.

The hydrocarbyl and halogen-substituted hydrocarbyl groups represented by $R^1$ typically have from 1 to 10 carbon atoms, alternatively from 1 to 6 carbon atoms, alternatively from 1 to 4 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

As used herein the term "hydrolysable group" means the silicon-bonded group reacts with water in either the presence or absence of a catalyst at any temperature from room temperature (~23±2° C.) to 100° C. within several minutes, for example thirty minutes, to form a silanol (Si—OH) group. Examples of hydrolysable groups represented by $R^2$ include, but are not limited to, —Cl, —Br, —$OR^3$, —$OCH_2CH_2OR^3$, $CH_3C(=O)O$—, $Et(Me)C=N$—O—, $CH_3C(=O)N(CH_3)$—, and —$ONH_2$, wherein $R^3$ is $C_1$ to $C_8$ hydrocarbyl or $C_1$ to $C_8$ halogen-substituted hydrocarbyl.

The hydrocarbyl and halogen-substituted hydrocarbyl groups represented by $R^3$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^3$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^3$ include, but are not limited to, 3,3,3-trifluoropropyl, 3-chloropropyl, chlorophenyl, and dichlorophenyl.

In the formula (I) of the silicone resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0 to 0.80, alternatively from 0.05 to 0.5, alternatively from 0.1 to 0.35. Still further, when y is 0, w+x/(w+x+y+z) is from 0.05 to 0.8, alternatively from 0.1 to 0.5.

Typically, at least 10 mol %, alternatively at least 50 mol %, alternatively at least 80 mol % of the groups $R^2$ in the silicone resin are hydrogen, hydroxy, or a hydrolysable group.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin can contain $R^2SiO_{3/2}$ units (i.e., T units), or $R^2SiO_{3/2}$ units (i.e., T units) and/or $SiO_{4/2}$ units (i.e., Q units) in combination with $R^1R^2_2SiO_{1/2}$ units (i.e., M units) and/or $R^2_2SiO_{2/2}$ units (i.e., D units), wherein $R^1$ and $R^2$ are as described and exemplified above. For example, the silicone resin can be a T resin, a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins include, but are not limited to, resins having the following formulae:
$(MeSiO_{3/2})_n$, $(PhSiO_{3/2})_n$, $(Me_3SiO_{1/2})_{0.8}(SiO_{4/2})_{0.2}$, $(MeSiO_{3/2})_{0.67}(PhSiO_{3/2})_{0.33}$, $(MeSiO_{3/2})_{0.45}(PhSiO_{3/2})_{0.40}(Ph_2SiO_{2/2})_{0.1}(PhMeSiO_{2/2})_{0.5}$, $(PhSiO_{3/2})_{0.4}(MeSiO_{3/2})_{0.45}(PhSiO_{3/2})_{0.1}(PhMeSiO_{2/2})_{0.05}$, and $(PhSiO_{3/2})_{0.4}(MeSiO_{3/2})_{0.1}(PhMeSiO_{2/2})_{0.5}$, where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

The first embodiment of the condensation-curable silicone composition can comprise a single silicone resin or a mixture comprising two or more different silicone resins, each as described above.

Methods of preparing silicone resins containing silicon-bonded hydrogen atoms, hydroxy groups, or hydrolysable groups are well known in the art; many of these resins are commercially available. Silicone resins are typically prepared by cohydrolyzing the appropriate mixture of silane precursors in an organic solvent, such as toluene. For example, a silicone resin can be prepared by cohydrolyzing a silane having the formula $R^1R^2_2SiX$ and a silane having the formula $R^2SiX_3$ in toluene, where $R^1$ is $C_1$ to $C_{10}$ hydrocarbyl or $C_1$ to $C_{10}$ halogen-substituted hydrocarby, $R^2$ is $R^1$, —H, or a hydrolysable group, and X is a hydrolysable group, provided when $R^2$ is a hydrolysable group, X is more reactive in the hydrolysis reaction than $R^2$. The aqueous hydrochloric acid and silicone hydrolyzate are separated and the hydrolyzate is washed with water to remove residual acid and heated in the presence of a mild condensation catalyst to "body" (i.e., condense) the resin to the requisite viscosity. If desired, the resin can be further treated with a condensation catalyst in an organic solvent to reduce the content of silicon-bonded hydroxy groups.

The first embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters; dyes; pigments; anti-oxidants; heat stabilizers; UV stabilizers; flame retardants; flow control additives; organic solvents, cross-linking agents, and condensation catalysts.

For example the silicone composition can further comprises a cross-linking agent and/or a condensation catalyst. The cross-linking agent can have the formula $R^3_qSiX_{4-q}$, wherein $R^3$ is $C_1$ to $C_8$ hydrocarbyl or $C_1$ to $C_8$ halogen-substituted hydrocarbyl, X is a hydrolysable group, and q is 0 or 1. The hydrocarbyl and halogen-substituted hydrocarbyl groups represented by $R^3$, and the hydrolysable groups represented by X are as described and exemplified above.

Examples of cross-linking agents include, but are not limited to, alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O-N=C(CH_3)CH_2CH_3]_3$, $Si[O-N=C(CH_3)CH_2CH_3]_4$, and $CH_2=CHSi[O-N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The cross-linking agent can be a single silane or a mixture of two or more different silanes, each as described above. Also, methods of preparing tri- and tetra-functional silanes are well known in the art; many of these silanes are commercially available.

When present, the concentration of the cross-linking agent in the silicone composition is sufficient to cure (cross-link) the silicone resin. The exact amount of the cross-linking agent depends on the desired extent of cure, which generally increases as the ratio of the number of moles of silicon-bonded hydrolysable groups in the cross-linking agent to the number of moles of silicon-bonded hydrogen atoms, hydroxy groups, or hydrolysable groups in the silicone resin increases. Typically, the concentration of the cross-linking agent is sufficient to provide from 0.2 to 4 moles of silicon-bonded hydrolysable groups per mole of silicon-bonded hydrogen atoms, hydroxy groups, or hydrolysable groups in the silicone resin. The optimum amount of the cross-linking agent can be readily determined by routine experimentation.

As stated above, the first embodiment of the condensation-curable silicone composition can further comprise at least one condensation catalyst. The condensation catalyst can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst can be selected from tin(II) and tin(IV) compounds such as tin dilaurate, tin dioctoate, and tetrabutyl tin; and titanium compounds such as titanium tetrabutoxide.

When present, the concentration of the condensation catalyst is typically from 0.1 to 10% (w/w), alternatively from 0.5 to 5% (w/w), alternatively from 1 to 3% (w/w), based on the total weight of the silicone resin.

According to a second embodiment, the condensation-curable silicone composition comprises (A) a rubber-modified silicone resin prepared by reacting an organosilicon compound selected from (i) a silicone resin having the formula $(R^1R^4{}_2SiO_{1/2})_w(R^4{}_2SiO_{2/2})_x(R^4SiO_{3/2})_y(SiO_{4/2})_z$ (II) and (ii) hydrolysable precursors of (i), and a silicone rubber having the formula $R^5{}_3SiO(R^1R^5SiO)_mSiR^5{}_3$ (III) in the presence of water, a condensation catalyst, and an organic solvent to form a soluble reaction product, wherein $R^1$ is $C_1$ to $C_{10}$ hydrocarbyl or $C_1$ to $C_{10}$ halogen-substituted hydrocarbyl, $R^4$ is $R^1$, —OH, or a hydrolysable group, $R^5$ is $R^1$ or a hydrolysable group, m is from 2 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8, the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5; and (B) a condensation catalyst.

Component (A) is a rubber-modified silicone resin prepared by reacting an organosilicon compound selected from (i) at least one silicone resin having the formula $(R^1R^4{}_2SiO_{1/2})_w(R^4{}_2SiO_{2/2})_x(R^4SiO_{3/2})_y(SiO_{4/2})_z$ (II) and (ii) hydrolysable precursors of (i), and at least one silicone rubber having the formula $R^5{}_3SiO(R^1R^5SiO)_mSiR^5{}_3$ (III) in the presence of water, a condensation catalyst, and an organic solvent to form a soluble reaction product, wherein $R^1$, w, x, y, z, y+z/(w+x+y+z), and w+x/(w+x+y+z) are as described and exemplified above for the silicone resin having the formula (I), the hydrolysable groups represented by $R^4$ and $R^5$ are as described and exemplified above for $R^2$, and m has a value of from 2 to 1,000, provided the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5. As used herein, the term "soluble reaction product" means the product of the reaction for preparing component (A) is miscible in the organic solvent and does not form a precipitate or suspension.

Typically at least 10 mol %, alternatively at least 50 mol %, alternatively at least 80 mol % of the groups $R^4$ in the silicone resin (i) are hydroxy or hydrolysable groups.

The silicone resin (i) typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin (i) at 25° C. is typically from 0.01 to 100,000 Pa·s, alternatively from 0.1 to 10,000 Pa·s, alternatively from 1 to 100 Pa·s.

The silicone resin (i) can contain $R^4SiO_{3/2}$ units (i.e., T units), or $R^4SiO_{3/2}$ units (i.e., T units) and/or $SiO_{4/2}$ units (i.e., Q units) in combination with $R^1R^4{}_2SiO_{1/2}$ units (i.e., M units) and/or $R^4{}_2SiO_{2/2}$ units (i.e., D units), wherein $R^1$ and $R^4$ are as described and exemplified above. For example, the silicone resin (i) can be a T resin, a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins suitable for use as silicone resin (i) include, but are not limited to, resins having the following formulae:
$(MeSiO_{3/2})_n$, $(PhSiO_{3/2})_n$, $(PhSiO_{3/2})_{0.4}$, $(MeSiO_{3/2})_{0.45}(PhSiO_{3/2})_{0.1}(PhMeSiO_{2/2})_{0.05}$, and $(PhSiO_{3/2})_{0.3}(SiO_{4/2})_{0.1}(Me_2SiO_{2/2})_{0.2}(Ph_2SiO_{2/2})_{0.4}$, where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

Silicone resin (i) can be a single silicone resin or a mixture comprising two or more different silicone resins, each having the formula (II).

Methods of preparing silicone resins suitable for use as silicone resin (i) are well known in the art; many of these resins are commercially available. For example, silicone resins are typically prepared by cohydrolyzing the appropriate mixture of silane precursors in an organic solvent, such as toluene, as described above for the silicone resin having the formula (I).

The organosilicon compound can also be (ii) hydrolysable precursors of the silicone resin having the formula (II). As used herein, the term "hydrolysable precursors" refers to silanes having hydrolysable groups that are suitable for use as starting materials (precursors) for preparation of the silicone resin having the formula (II). The hydrolysable precursors can be represented by the formulae $R^1R^4{}_2SiX$, $R^4{}_2SiX_2$, $R^4SiX_3$, and $SiX_4$, wherein $R^1$ is $C_1$ to $C_{10}$ hydrocarbyl or $C_1$ to $C_{10}$ halogen-substituted hydrocarbyl, $R^4$ is $R^1$ or a hydrolysable group, and X is a hydrolysable group. Examples of hydrolysable precursors include, but are not limited to, silanes having the formulae:

$Me_2ViSiCl$, $Me_3SiCl$, $MeSi(OEt)_3$, $PhSiCl_3$, $MeSiCl_3$, $Me_2SiCl_2$, $PhMeSiCl_2$, $SiCl_4$, $Ph_2SiCl_2$, $PhSi(OMe)_3$, $MeSi(OMe)_3$, $PhMeSi(OMe)_2$, and $Si(OEt)_4$, wherein Me is methyl, Et is ethyl, and Ph is phenyl.

Methods of preparing silanes having hydrolysable groups are well known in the art; many of these compounds are commercially available.

In the formula (III) of the silicone rubber, $R^1$ and $R^5$ are as described and exemplified above, and the subscript m typically has a value of from 2 to 1,000, alternatively from 4 to 500, alternatively from 8 to 400.

Examples of silicone rubbers having the formula (III) include, but are not limited to, silicone rubbers having the following formulae:

$(EtO)_3SiO(Me_2SiO)_{55}Si(OEt)_3$, $(EtO)_3SiO(Me_2SiO)_{16}Si(OEt)_3$, $(EtO)_3SiO(Me_2SiO)_{386}Si(OEt)_3$, and $(EtO)_2MeSiO(PhMeSiO)_{10}SiMe(OEt)_2$, wherein Me is methyl and Et is ethyl.

The silicone rubber having the formula (III) can be a single silicone rubber or a mixture comprising two or more different silicone rubbers, each having the formula (III). For example the silicone rubber can comprise a first silicone rubber having a dp (degree of polymerization), denoted by the value of m in formula III, of about 15 and a second silicone rubber having a dp of about 350.

Methods of preparing silicone rubbers containing silicon-bonded hydrolysable groups are well known in the art; many of these compounds are commercially available.

The condensation catalyst used in the preparation of the rubber-modified silicone resin of component (A) is as described and exemplified above for the first embodiment of the condensation-curable silicone composition. In particular, titanium compounds are suitable condensation catalysts for use in the preparation of component (A).

The organic solvent is at least one organic solvent. The organic solvent can be any aprotic or dipolar aprotic organic solvent that does not react with the organosilicon compound, the silicone rubber, or the rubber-modified silicone resin under the conditions for preparing component (A), described below, and is miscible with the aforementioned components.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as defined above.

The organosilicon compound, the silicone rubber, condensation catalyst, and organic solvent can be combined in any order. Typically, the organosilicon compound, silicone rubber, and organic solvent are combined before the introduction of the condensation catalyst.

The mole ratio of silicon-bonded hydrolysable groups in the silicone rubber to silicon-bonded hydroxy or hydrolysable groups in the silicone resin having the formula (II) is typically from 0.01 to 1.5, alternatively from 0.05 to 0.8, alternatively from 0.2 to 0.5.

The concentration of water in the reaction mixture depends on the nature of the groups $R^4$ in the organosilicon compound and the nature of the silicon-bonded hydrolysable groups in the silicone rubber. When the organosilicon compound contains hydrolysable groups, the concentration of water is sufficient to effect hydrolysis of the hydrolysable groups in the organosilicon compound and the silicone rubber. For example, the concentration of water is typically from 0.01 to 3 moles, alternatively from 0.05 to 1 moles, per mole of hydrolysable group in the organosilicon compound and the silicone rubber combined. When the organosilicon compound does not contain hydrolysable groups, only a trace amount, e.g., 100 ppm, of water is required in the reaction mixture. Trace amounts of water are normally present in the reactants and/or solvent.

The concentration of the condensation catalyst is sufficient to catalyze the condensation reaction of the organosilicon compound with the silicone rubber. Typically, the concentration of the condensation catalyst is from 0.01 to 2% (w/w), alternatively from 0.01 to 1% (w/w), alternatively from 0.05 to 0.2% (w/w), based on the weight of the organosilicon compound.

The concentration of the organic solvent is typically from 10 to 95% (w/w), alternatively from 20 to 85% (w/w), alternatively from 50 to 80% (w/w), based on the total weight of the reaction mixture.

The reaction is typically carried out at a temperature of from room temperature (~23±2° C.) to 180° C., alternatively from room temperature to 100° C.

The reaction time depends on several factors, including the structures of the organosilicon compound and the silicone rubber, and the temperature. The components are typically allowed to react for a period of time sufficient to complete the condensation reaction. This means the components are allowed to react until at least 95 mol %, alternatively at least 98 mol %, alternatively at least 99 mol %, of the silicon-bonded hydrolysable groups originally present in the silicone rubber have been consumed in the condensation reaction, as determined by $^{29}Si$ NMR spectrometry. The time of reaction is typically from 1 to 30 h at a temperature of from room temperature (~23±2° C.) to 100° C. The optimum reaction time can be determined by routine experimentation using the methods set forth in the Examples section below.

The rubber-modified silicone resin can be used without isolation or purification in the second embodiment of the condensation-curable silicone composition or the resin can be separated from most of the solvent by conventional methods of evaporation. For example, the reaction mixture can be heated under reduced pressure.

Component (B) of the second embodiment of the condensation-curable silicone composition is at least one condensation catalyst, where the catalyst is as described and exemplified above for the first embodiment of the silicone composition. In particular, zinc compounds and amines are suitable for use as component (B) of the present silicone composition.

The concentration of component (B) is typically from 0.1 to 10% (w/w), alternatively from 0.5 to 5% (w/w), alternatively from 1 to 3% (w/w), based on the weight of component (A).

The second embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters, dyes, pigments, anti-oxidants, heat stabilizers, UV stabilizers, flame retardants, flow control additives, cross-linking agents, and organic solvents.

For example the second embodiment of the condensation-curable silicone composition can further comprises a cross-linking agent having the formula $R^3_q SiX_{4-q}$, wherein $R^3$, X, and q are as described and exemplified above for the cross-linking agent of the first embodiment. The cross-linking agent can be a single silane or a mixture of two or more different silanes, each as described above.

When present, the concentration of the cross-linking agent in the second embodiment of the condensation-curable silicone composition is sufficient to cure (cross-link) the rubber-modified silicone resin of component (A). The exact amount of the cross-linking agent depends on the desired extent of cure, which generally increases as the ratio of the number of moles of silicon-bonded hydrolysable groups in the cross-linking agent to the number of moles of silicon-bonded hydroxy or hydrolysable groups in the rubber-modified silicone resin increases. Typically, the concentration of the cross-linking agent is sufficient to provide from 0.2 to 4 moles of silicon-bonded hydrolysable groups per mole of silicon-bonded hydroxy or hydrolysable groups in the rubber-modified silicone resin. The optimum amount of the cross-linking agent can be readily determined by routine experimentation.

The carbon nanomaterial of the nanomaterial-filled silicone composition can be any carbon material having at least one physical dimension (e.g., particle diameter, fiber diameter, layer thickness) less than about 200 nm. Examples of carbon nanomaterials include, but are not limited to, carbon nanoparticles having three dimensions less than about 200 nm, such as quantum dots, hollow spheres, and fullerenes; fibrous carbon nanomaterials having two dimensions less than about 200 nm, such as nanotubes (e.g., single-walled nanotubes and multi-walled nanotubes) and nanofibers (e.g., axially aligned, platelet, and herringbone or fishbone nanofibers); and layered carbon nanomaterials having one dimension less than about 200 nm, such as carbon nanoplatelets (e.g., exfoliated graphite and graphene sheet). The carbon nanomaterial can be electrically conductive or semiconductive.

The carbon nanomaterial can also be an oxidized carbon nanomaterial, prepared by treating the aforementioned carbon nanomaterials with an oxidizing acid or mixture of acids at elevated temperature. For example, the carbon nanomaterial can be oxidized by heating the material in a mixture of concentrated nitric and concentrated sulfuric acid (1:3 v/v, 25 mL/g carbon) at a temperature of from 40 to 150° C. for 1-3 hours.

The carbon nanomaterial can be a single carbon nanomaterial or a mixture comprising at least two different carbon nanomaterials, each as described above.

The concentration of the carbon nanomaterial is typically from 0.0001 to 99% (w/w), alternatively from 0.001 to 50% (w/w), alternatively from 0.01 to 25% (w/w), alternatively from 0.1 to 10% (w/w), alternatively from 1 to 5% (w/w), based on the total weight of the nanomaterial-filled silicone composition.

Methods of preparing carbon nanomaterials are well-known in the art. For example, carbon nanoparticles (e.g., fullerenes) and fibrous carbon nanomaterials (e.g., nanotubes, and nanofibers) can be prepared using at least one of the following methods: arc discharge, laser ablation, and catalytic chemical vapor deposition. In the arc discharge process, an arc discharge between two graphite rods produces, depending on the gas atmosphere, single-walled nanotubes, multi-walled nanotubes, and fullerenes. In the laser ablation method, a graphite target loaded with a metal catalyst is irradiated with a laser in a tube furnace to produce single- and multi-walled nanotubes. In the catalytic chemical vapor deposition method, a carbon-containing gas or gas mixture is introduced into a tube furnace containing a metal catalyst at a temperature of from 500 to 1000° C. (and different pressures) to produce carbon nanotubes and nanofibers. Carbon nanoplatelets can be prepared by the intercalation and exfoliation of graphite.

The nanomaterial-filled silicone composition can be a one-part composition containing the silicone resin and carbon nanomaterial in a single part or, alternatively, a multi-part composition comprising these components in two or more parts. When the silicone composition contains a condensation catalyst, the composition is typically a two-part composition where the silicone resin and condensation catalyst are in separate parts.

A method of preparing a silicone resin film according to the present invention comprises the steps of:
  coating a release liner with a nanomaterial-filled silicone composition, wherein the silicone composition comprises:
    a condensation-curable silicone composition comprising a silicone resin having an average of at least two silicon-bonded hydrogen atoms, hydroxy groups, or hydrolysable groups per molecule, and
    a carbon nanomaterial; and
  curing the silicone resin of the coated release liner.

In the first step of the method of preparing a silicone resin film, a release liner is coated with a nanomaterial-filled silicone composition, wherein the nanomaterial-filled silicone composition is as described and exemplified above.

The release liner can be any rigid or flexible material having a surface from which the silicone resin film can be removed without damage by delamination after the silicone resin is cured, as described below. Examples of release liners include, but are not limited to, silicon, quartz; fused quartz; aluminum oxide; ceramics; glass; metal foils; polyolefins such as polyethylene, polypropylene, polystyrene, and polyethyleneterephthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones. The release liner can also be a material, as exemplified above, having a surface treated with a release agent, such as a silicone release agent.

The release liner can be coated with the nanomaterial-filled silicone composition using conventional coating techniques, such as spin coating, dipping, spraying, brushing, or screen-printing. The amount of silicone composition is sufficient to form a cured silicone resin film having a thickness of from 1 to 500 μm in the second step of the method, described below.

The method of preparing the silicone resin film can further comprise, before the second step of curing, described below, applying a second release liner to the coated release liner of the first step to form an assembly, where the second release liner is in contact with the coating, and compressing the assembly. The assembly can be compressed to remove excess silicone composition and/or entrapped air, and to reduce the thickness of the coating. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 50° C.

In the second step of the method of preparing a silicone resin film, the silicone resin of the coated release liner is cured. The conditions for curing the silicone resin depend on the nature of the silicon-bonded groups in the resin. For example, when the silicone resin does not contain silicon-bonded hydrogen atoms or hydrolysable groups, the silicone resin can be cured (i.e., cross-linked) by heating the coating. For example, the silicone resin can typically be cured by heating the coating at a temperature of from 50 to 250° C., for a period of from 1 to 50 h. When the nanomaterial-filled silicone composition comprises a condensation catalyst, the silicone resin can typically be cured at a lower temperature, e.g., from room temperature (~23±2° C.) to 200° C.

Also, when the silicone resin contains silicon-bonded hydrogen atoms (e.g., silicone resin of the first embodiment of the silicone composition), the silicone resin can be cured by exposing the coating to moisture or oxygen at a temperature of from 100 to 450° C. for a period of from 0.1 to 20 h. When the nanomaterial filled silicone composition contains a condensation catalyst, the silicone resin can typically be cured at a lower temperature, e.g., from room temperature (~23±2° C.) to 400° C.

Further, when the silicone resin contains silicon-bonded hydrolysable groups, the silicone resin can be cured by exposing the coating to moisture at a temperature of from room temperature (~23±2° C.) to 250° C., alternatively from 100 to 200° C., for a period of from 1 to 100 h. For example, the silicone resin can typically be cured by exposing the coating to a relative humidity of 30% at a temperature of from about room temperature (~23±2° C.) to 150° C., for a period of from 0.5 to 72 h. Cure can be accelerated by application of heat, exposure to high humidity, and/or addition of a condensation catalyst to the composition.

The silicone resin can be cured at atmospheric or subatmospheric pressure. For example, when the coating is not enclosed between a first and second release liner, the silicone resin is typically cured at atmospheric pressure in air. Alternatively, when the coating is enclosed between a first and second release liner, the silicone resin is typically cured under reduced pressure. For example, the silicone resin can be heated under a pressure of from 1,000 to 20,000 Pa, alternatively from 1,000 to 5,000 Pa. The silicone resin can be cured under reduced pressure using a conventional vacuum bagging process. In a typically process, a bleeder (e.g., polyester) is applied over the coated release liner, a breather (e.g, Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly and, if necessary, the evacuated assembly is heated as described above.

The method can further comprise the step of separating the cured silicone resin from the release liner(s). The cured silicone resin can be separated from the release liner by mechanically peeling the film away from the release liner.

The method of the present invention can further comprise forming a coating on at least a portion of the silicone resin film. Examples of coatings include, but are not limited to, cured silicone resins prepared by curing hydrosilylation-curable silicone resins or condensation-curable silicone resins; cured silicone resins prepared by curing sols of organosilsesquioxane resins; inorganic oxides, such as indium tin oxide, silicon dioxide, and titanium dioxide; inorganic nitrides, such as silicon nitride and gallium nitride; metals, such as copper, silver, gold, nickel, and chromium; and silicon, such as amorphous silicon, microcrystalline silicon, and polycrystalline silicon.

The silicone resin film of the present invention typically comprises from 10 to 99% (w/w), alternatively from 30 to 95% (w/w), alternatively from 60 to 95% (w/w), alternatively from 80 to 95% (w/w), of the cured silicone resin. Also, the silicone resin film typically has a thickness of from 1 to 500 μm, alternatively from 15 to 500 pm, alternatively from 15 to 300 μm, alternatively from 20 to 150 μm, alternatively from 30 to 125 μm.

The silicone resin film typically has a flexibility such that the film can be bent over a cylindrical steel mandrel having a diameter less than or equal to 3.2 mm without cracking, where the flexibility is determined as described in ASTM Standard D522-93a, Method B.

The silicone resin film has low coefficient of linear thermal expansion (CTE), high tensile strength, and high modulus. For example the film typically has a CTE of from 0 to 80 μm/m° C., alternatively from 0 to 20 μm/m° C., alternatively from 2 to 10 μm/m° C., at temperature of from room temperature (~23±2° C.) to 200° C. Also, the film typically has a tensile strength at 25° C. of from 5 to 200 MPa, alternatively from 20 to 200 MPa, alternatively from 50 to 200 MPa. Further, the silicone resin film typically has a Young's modulus at 25° C. of from 0.3 to 10 GPa, alternatively from 1 to 6 GPa, alternatively from 3 to 5 GPa.

The transparency of the silicone resin film depends on a number of factors, such as the composition of the cured silicone resin, the thickness of the film, and the type and concentration of the carbon nanomaterial. The silicone resin film typically has a transparency (% transmittance) of at least 50%, alternatively at least 60%, alternatively at least 75%, alternatively at least 85%, in the visible region of the electromagnetic spectrum.

The silicone resin film of the present invention has low coefficient of thermal expansion, high tensile strength, and high modulus compared to a silicone resin film prepared from the same silicone composition absent the carbon nanomaterial. Also, although the filled (i.e., carbon nanomaterial-containing) and unfilled silicone resin films have comparable glass transition temperatures, the former film typically exhibits a smaller change in modulus in the temperature range corresponding to the glass transition.

The silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

EXAMPLES

The following examples are presented to better illustrate the nanomaterial-filled silicone composition, method, and silicone resin film of the present invention, but are not to be considered as limiting the invention, which is delineated in the appended claims. Unless otherwise noted, all parts and percentages reported in the examples are by weight. The following methods and materials were employed in the examples: Measurement of Mechanical Properties Young's modulus, tensile strength, and tensile strain at break were measured using an MTS Alliance RT/5 testing frame, equipped with a 100-N load cell. Young's modulus, tensile strength, and tensile strain were determined at room temperature (~23±2° C.) for the test specimens of Examples 4 and 5.

The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus. Reported values for Young's modulus (GPa), tensile strength (MPa), and tensile strain (%) each represent the average of three measurements made on different dumbbell-shaped test specimens from the same silicone resin film.

The highest point on the load-displacement curve was used to calculate the tensile strength according to the equation:

$$\sigma = F/(wb),$$

where:
$\sigma$=tensile strength, MPa,
F=highest force, N,
w=width of the test specimen, mm, and
b=thickness of the test specimen, mm.

The tensile strain at break was approximated by dividing the difference in grip separation before and after testing by the initial separation according to the equation:

$$\in = 100(l_2 - l_1)/l_1,$$

where:
$\in$=tensile strain at break, %,
$l_2$=final separation of the grips, mm, and
$l_1$=initial separation of the grips, mm.

Pyrograf®-III grade HHT-19 carbon nanofiber, sold by Pyrograf Products, Inc. (Cedarville, Ohio), is a heat-treated (up to 3000° C.) carbon nanofiber having a diameter of 100 to 200 nm and a length of 30,000 to 100,000 nm.

Melinex® 516, sold by Dupont Teijin Films (Hopewell, Va.), is a polyethylene-terephthalate (PET) film, which is pretreated for slip, having a thickness of 100 μm.

SDC MP101 Crystal Coat Resin, which is sold by SDC Technologies, Inc. (Anaheim, Calif.) is a solution containing 31% (w/w) of a silicone resin consisting essentially of $MeSiO_{3/2}$ units and $SiO_{4/2}$ units in a mixture of methanol, 2-propanol, water, and acetic acid (~1-2%).

Dow Corning® 4-3136 Binder Resin, which is sold by Dow Corning Corporation (Midland, Mich.), is a silanol-functional silicone resin in xylene, where the resin has the formula $(PhSiO_{3/2})_{0.40}(MeSiO_{3/2})_{0.45}(PhMeSiO_{2/2})_{0.5}(Ph_2SiO_{2/2})_{0.10}$ and the resin contains about 2 to 3% (w/w) of silicon-bonded hydroxy (silanol) groups.

Dow Corning® 805 Resin, which is sold by Dow Corning Corporation (Midland, Mich.), is a solution containing 50% (w/w) of a silanol-functional silicone resin in xylene, where the resin has the formula $(PhMeSiO_{2/2})_{0.39}(Ph_2SiO_{2/2})_{0.07}(PhSiO_{3/2})_{0.35}(MeSiO_{3/2})_{0.19}$ and the resin contains about 1% (w/w) of silicon-bonded hydroxy (silanol) groups.

Dow Corning® Y-177 Catalyst, which is sold by Dow Corning Corporation (Midland, Mich.), is a mixture of a zinc carboxylate (~6%) salt and choline 2-ethylhexanoate (~3%) in n-butanol and toluene.

Example 1

This example demonstrates the preparation of a chemically oxidized carbon nanofiber. Pyrograf®-III carbon nanofiber (2.0 g), 12.5 mL of concentrated nitric acid, and 37.5 mL of concentrated sulfuric acid were combined sequentially in a 500-mL three-neck flask equipped with a condenser, a thermometer, a Teflon-coated magnetic stirring bar, and a temperature controller. The mixture was heated to 80° C. and kept at this temperature for 3 h. The mixture was then cooled by placing the flask on a layer of dry ice in a one gallon pail. The mixture was poured into a Buchner funnel containing a nylon membrane (0.8 μm) and the carbon nanofibers were collected by vacuum filtration. The nanofibers remaining on the membrane were washed several times with deionized water until the pH of the filtrate was equal to the pH of the wash water. After the last wash, the carbon nanofibers were kept in the funnel for an additional 15 min. with continued application of the vacuum. Then the nanofibers, supported on the filter membrane, were placed in an oven at 100° C. for 1 h. The carbon nanofibers were removed from filter membrane and stored in a dry sealed glass jar.

Example 2

The oxidized carbon nanofiber of Example 1 (0.155 g) and 50.0 g of SDC MP101 Crystal Coat Resin were combined in a glass vial. The vial was placed in an ultrasonic bath for 30 min. The mixture was then subjected to centrifugation at 2000 rpm for 30 min. The supernatant dispersion (1.0 g) was combined with 10.0 g of a solution of 4.0 g of Dow Corning® 4-3136 Binder Resin in 6.0 g of methyl isobutyl ketone. The mixture was then subjected to centrifugation at 1500 rpm for 30 min. The supernatant was transferred to a clean vial and kept under vacuum (45 mm Hg) at 50° C. for 90 min. to remove most of the methyl isobutyl ketone.

Example 3

The oxidized carbon nanofiber of Example 1 (0.015 g) and 16.3 g of a solution of 10.6 g of Dow Corning® 805 Resin in 5.7 g of methyl isobutyl ketone were combined in a glass vial. The vial was placed in an ultrasonic bath for 115 min. The mixture was then subjected to centrifugation at 1500 rpm for 30 min. The supernatant was transferred to a clean vial and kept under vacuum (45 mm Hg) at 50° C. for 90 min. to remove most of the methyl isobutyl ketone.

Example 4

The silicone composition of Example 2 (11.0 g) was mixed with 0.05 g of Dow Corning® Y-177 Catalyst. The resulting composition (2.0 g) was applied on the surface (release agent-treated) of a Melinex® 516 PET film (8 in.×11 in.). The coated PET film was allowed to stand in a fume hood at room temperature overnight. The coated film was then heated in an oven according to the following cycle: room temperature to 120° C. at 2° C./minute, 120° C. for 30 min., 120° C. to 160° C. at 2° C./min., 160° C. to 200° C. at 2° C./minute, 200° C. for 60 min. The oven was turned off and the coated film was allowed to cool to room temperature inside the oven. The modulus, tensile strength, and tensile strain at break of the coated PET film and an uncoated PET film were measured at room temperature. The corresponding properties for the silicone resin film, shown in Table 1, were calculated by subtracting the values for the uncoated PET film from the values for the coated PET film.

Example 5

A silicone resin film was prepared according to the method of Example 4, except the silicone composition of Example 3 was substituted for the silicone composition of Example 2. The mechanical properties of the silicone resin film are shown in Table 1.

TABLE 1

| Ex. | Thickness (mm) | Tensile Strength (MPa) | Young's Modulus (MPa) | Tensile Strain at Break (%) |
|---|---|---|---|---|
| 4 | 0.03 | 48.65 | 990.3 | 9.1 |
| 5 | 0.02 | 143.43 | 551.4 | 30.7 |

That which is claimed is:

1. A nanomaterial-filled silicone composition, comprising:
a condensation-curable silicone composition comprising a silicone resin having an average of at least two silicon-bonded hydrogen atoms, hydroxy groups, or hydrolysable groups per molecule; a condensation catalyst; and a carbon nanomaterial, wherein the condensation-curable silicone composition comprises
a silicon resin having the formula $(R^1R^2_2SiO_{1/2})_w(R^2_2SiO_{2/2})_x(R^1SiO_{3/2})_y(SiO_{4/2})_z$ (I), or (A) a rubber-modified silicon resin prepared by reacting an organosilicon compound selected from (i) a silicon resin having the formula $(R^1R^4_2SiO_{1/2})_w(R^4_2SiO_{2/2})_x(R^4SiO_{3/2})_y(SiO_{4/2})_z$ (II) and (ii) hydrolysable precursors of (i), and a silicone rubber having the formula $R^5_3SiO(R^1R^5SiO)_m Si R^5_3$ (III) in the presence of water,
a condensation catalyst, and an organic solvent to form a soluble reaction product,
wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, $R^4$ is $R^1$, —OH, or a hydrolysable group, $R^5$ is $R^1$ or a hydrolysable group, m is from 2 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8.

2. The nanomaterial-filled silicone composition according to claim 1, wherein the silicon resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5; and (B) a condensation catalyst.

3. The nanomaterial-filled silicone composition according to claim 1, wherein the carbon nanomaterial is selected from carbon nanoparticles, fibrous carbon nanomaterials, and layered carbon nanomaterials.

4. The nanomaterial-filled silicone composition according to claim 1, wherein the concentration of the carbon nanomaterial is from 0.001 to 50% (w/w), based on the total weight of the nanomaterial-filled silicone composition.

5. A method of preparing a silicone resin film, the method comprising the steps of: coating a release liner with a nanomaterial-filled silicone composition, wherein the silicone composition comprises:
a condensation-curable silicone composition comprising a silicone resin having an average of at least two silicon-bonded hydrogen atoms, hydroxy groups, or hydrolysable groups per molecule, a condensation catalyst, and a carbon nanomaterial, wherein the condensation-curable silicone composition comprises
a silicon resin having the formula $(R^1R^2_2SiO_{1/2})_w(R^2_2SiO_{2/2})_x(R^1SiO_{3/2})_y(SiO_{4/2})_z$ (I), or (A) a rubber-modified silicon resin prepared by reacting an organosilicon compound selected from (i) a silicon resin having the formula $(R^1R^4_2SiO_{1/2})_w(R^4_2SiO_{2/2})_x(R^4SiO_{3/2})_y(SiO_{4/2})_z$ (II) and (ii) hydrolysable precursors of (i), and a silicone rubber having the formula $R^5_3SiO(R^1R^5SiO)_m Si R^5_3$ (III) in the presence of water,
a condensation catalyst, and an organic solvent to form a soluble reaction product,
wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, $R^4$ is $R^1$, —OH, or a hydrolysable group, $R^5$ is $R^1$ or a hydrolysable group, m is from 2 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0 to 0.8, provided when y is 0, w+x/(w+x+y+z) is from 0.05 to 0.8; and
curing the silicone resin of the coated release liner.

6. The method according to claim 5, wherein the carbon nanomaterial is selected from carbon nanoparticles, fibrous carbon nanomaterials, and layered carbon nanomaterials.

7. The method according to claim 5, wherein the concentration of the carbon nanomaterial is from 0.001 to 50% (w/w), based on the total weight of the nanomaterial-filled silicone composition.

8. A silicone resin film prepared according to the method of claim 5.

9. The method according to claim 5, further comprising forming a coating on at least a portion of the silicone resin film.

10. The method according to claim 9, wherein the coating is a cured silicone resin.

11. A silicone resin film prepared according to the method of claim 9.

* * * * *